United States Patent
Hagiwara et al.

(10) Patent No.: US 8,539,248 B2
(45) Date of Patent: Sep. 17, 2013

(54) ASSOCIATING BIOMETRIC INFORMATION WITH PASSWORDS

(75) Inventors: Mikio Hagiwara, Kanagawa-ken (JP); Kishiko Itoh, Tokyo-to (JP); Kenji Oka, Kanagawa-ken (JP); Akira Hino, Kanagawa-ken (JP); Masaki Obinata, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 2044 days.

(21) Appl. No.: 10/956,874

(22) Filed: Oct. 2, 2004

(65) Prior Publication Data

US 2006/0075256 A1   Apr. 6, 2006

(51) Int. Cl.
*G06F 21/00* (2013.01)

(52) U.S. Cl.
USPC ............. 713/186; 713/185; 726/2; 726/26; 726/27; 726/28

(58) Field of Classification Search
USPC ............. 726/20, 2, 26, 27, 28; 713/185, 713/186
See application file for complete search history.

(56) References Cited

U.S. PATENT DOCUMENTS

| | | | | |
|---|---|---|---|---|
| 5,953,422 A * | 9/1999 | Angelo et al. | | 713/185 |
| 6,035,406 A * | 3/2000 | Moussa et al. | | 726/18 |
| 6,636,973 B1 * | 10/2003 | Novoa et al. | | 726/20 |
| 6,644,557 B1 * | 11/2003 | Jacobs | | 236/46 R |
| 6,957,337 B1 * | 10/2005 | Chainer et al. | | 713/186 |
| 6,957,338 B1 * | 10/2005 | Sumino | | 713/186 |
| 8,214,652 B2 * | 7/2012 | Lacous | | 713/186 |
| 2002/0038426 A1 * | 3/2002 | Pettersson et al. | | 713/186 |
| 2002/0095588 A1 * | 7/2002 | Shigematsu et al. | | 713/186 |
| 2003/0074585 A1 * | 4/2003 | Charbonneau | | 713/202 |
| 2004/0010724 A1 * | 1/2004 | Brown et al. | | 713/202 |
| 2005/0044386 A1 * | 2/2005 | Libin et al. | | 713/185 |
| 2006/0021003 A1 * | 1/2006 | Fisher et al. | | 726/1 |
| 2012/0054741 A1 * | 3/2012 | Ali et al. | | 718/1 |

FOREIGN PATENT DOCUMENTS

| | | |
|---|---|---|
| JP | 10-198453 | 7/1998 |
| JP | 11-053317 | 2/1999 |
| JP | 2000-322145 | 11/2000 |
| JP | 2001-159926 | 6/2001 |
| JP | 2002-222022 | 8/2002 |
| WO | WO03029938 A1 * | 4/2003 |

* cited by examiner

*Primary Examiner* — Nathan Flynn
*Assistant Examiner* — Sarah Su
(74) *Attorney, Agent, or Firm* — Thomas Tyson

(57) ABSTRACT

Associating biometric information with passwords is disclosed. If biometric information received from a user matches stored biometric information, stored passwords associated therewith are retrieved. If these stored passwords are identical to access-enabling passwords, then the user is permitted to gain access associated with the access-enabling passwords. If the biometric information matches the stored biometric information but the stored passwords do not match the access-enabling passwords or are not present, then the user is requested to manually enter passwords, which are stored. If these stored passwords are identical to the access-enabling passwords, the user is permitted to gain access. However, if the biometric information does not match the stored biometric information, or if the biometric information has not been received from the user or is not present, then the user is requested to manually enter passwords. If these passwords match the access-enabling passwords, then the user is permitted to gain access.

8 Claims, 3 Drawing Sheets

ASSOCIATING BIOMETRIC INFORMATION WITH PASSWORDS

FIELD OF THE INVENTION

The present invention relates generally to using biometric information to secure access within computer systems, and more particularly to using such biometric information by associating it with passwords.

BACKGROUND OF THE INVENTION

There are several ways to protect computer systems from unauthorized access. One of the most popular ways is to use passwords. In order to use a given computer system, a user has to enter the correct password. If the user enters the correct password, access to the computer system is permitted. However, if the user does not enter the correct password, access to the computer system is denied.

Another way to protect computer systems from unauthorized access that is becoming more popular is to employ biometric information. Biometric information can include fingerprint scans, retinal scans, and face geometry, among other types of biometric information. For example, in order to use a given computer system, a user may have to press his or her finger against a fingerprint-scanning device. The fingerprint-scanning device scans the fingerprint of the user's finger, and determines whether the user should be permitted or denied access to the computer system.

Using biometric information in lieu of passwords is becoming more popular because users do not have to remember passwords in order to gain access to computer systems. However, biometric information has some disadvantages. If the user temporarily or permanently loses his or her fingerprint due to injury, then the user will not be able to access a computer system. Furthermore, some legacy security systems are not amenable to replacing their existing password security schemes with biometric security schemes.

For instance, most computers have a type of firmware known as a basic input/output system (BIOS). The BIOS of a computer can provide at least one of three different types of password security forms: a hard disk password (HDP), a power-on password (POP), and a supervisor password (SVP). The HDP controls access to the hard disk drives or other storage devices of a computer. The POP controls access to the loading of the operating system. The SVP is a master password that may control access to administrative settings in addition to the loading of the operating system.

Many existing biometric security schemes meant to replace existing password security schemes require that a special application program be loaded in order to operate properly. However, such existing biometric security schemes do not work with legacy security schemes having password security schemes, like the BIOS of a computer. For instance, the BIOS of a computer does not provide for any special application program to be loaded, since, indeed, the BIOS of the computer is operative before the operating system is even loaded. For these and other reasons, therefore, there is a need for the present invention.

SUMMARY OF THE INVENTION

The present invention relates to associating biometric information with passwords. A method of the invention receives biometric information from a user. In response to determining that the biometric information matches stored biometric information, the method retrieves one or more stored passwords associated with the biometric information. In response to determining that the stored passwords are identical to one or more access-enabling passwords, the method permits the user to gain access of a computer system associated with the access-enabling passwords, without having to have any special application computer program or other computer program into the computer system.

Furthermore, in response to determining that the biometric information matches the stored biometric information, but that the stored passwords are not identical to the access-enabling passwords, the method requests the user to manually enter one or more passwords. These passwords are stored as the stored passwords associated with the biometric information. In response to determining that the stored passwords are identical to the access-enabling passwords, the user is permitted to gain the access associated with the access-enabling passwords.

In response to determining that the biometric information matches the stored biometric information, but that the stored passwords are not present, the method likewise requests the user to manually enter passwords, which are stored as the stored passwords associated with the biometric information. The method determines whether the stored passwords are identical to the access-enabling passwords. If so, the user is permitted to gain the access associated with the access-enabling passwords.

However, if the biometric information does not match the stored biometric information, the method requests the user to manually enter one or more passwords. If these passwords match the access-enabling passwords, then the user is permitted to gain the access associated with the access-enabling passwords. Similarly, if the biometric information has not been received from the user, or is otherwise not present, then the method requests the user to manually enter passwords, and the user is permitted to gain the access associated with the access-enabling passwords if the entered passwords match.

Another method of the invention performs the following. Where previously stored biometric information has been enabled and is present, a user is prompted to enter inputted biometric information. Where the inputted biometric information is identical to the previously stored biometric information, and where one or more passwords corresponding to the previously stored biometric information have not been stored, or where the previously stored biometric information has not been enabled or is not present, the user is prompted to manually enter the passwords. Where the passwords are identical to one or more stored access-enabling passwords, and where the previously stored biometric information has been enabled and is present, then the previously stored biometric information is related to the passwords, such that the passwords are associated with the previously stored biometric information. Where the passwords are identical to the stored access-enabling passwords, the user is permitted to gain access associated with the stored access-enabling passwords.

A system of the invention includes a biometric mechanism, a first security mechanism, and a second security mechanism. The biometric mechanism is to receive first biometric information from a user. The first security mechanism has stored therein first passwords manually entered by a user. The second security mechanism has stored therein second biometric information, and second passwords associated therewith. The second security mechanism passes the second passwords to the first security mechanism for matching to the first passwords, where the first biometric information matches the second biometric information.

Furthermore, the second security mechanism is to prompt the user for third passwords and pass them to the first security mechanism for matching to the first passwords, where the second biometric information does not match the first biometric information. The passwords may include power-on passwords (POP's), hard disk passwords (HDP's), and supervisor passwords (SVP's), among other types of passwords. The first and the second security mechanisms may be part of the basic input/output system (BIOS) of a computer.

Embodiments of the invention provide for advantages over the prior art. First, the invention can be used in conjunction with legacy security systems that employ password security schemes, even where the operating system has not been loaded yet. For instance, the invention can be used as part of the BIOS of a computer system. Second, the invention provides for two different types of authentication. Preferably, users provide biometric information to obtain access to the computer system. However, if a user cannot provide the biometric information—for instance, if the user has suffered an injury resulting in him or her being unable to provide the biometric information—then the user can still manually enter passwords to obtain access to the computer system.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
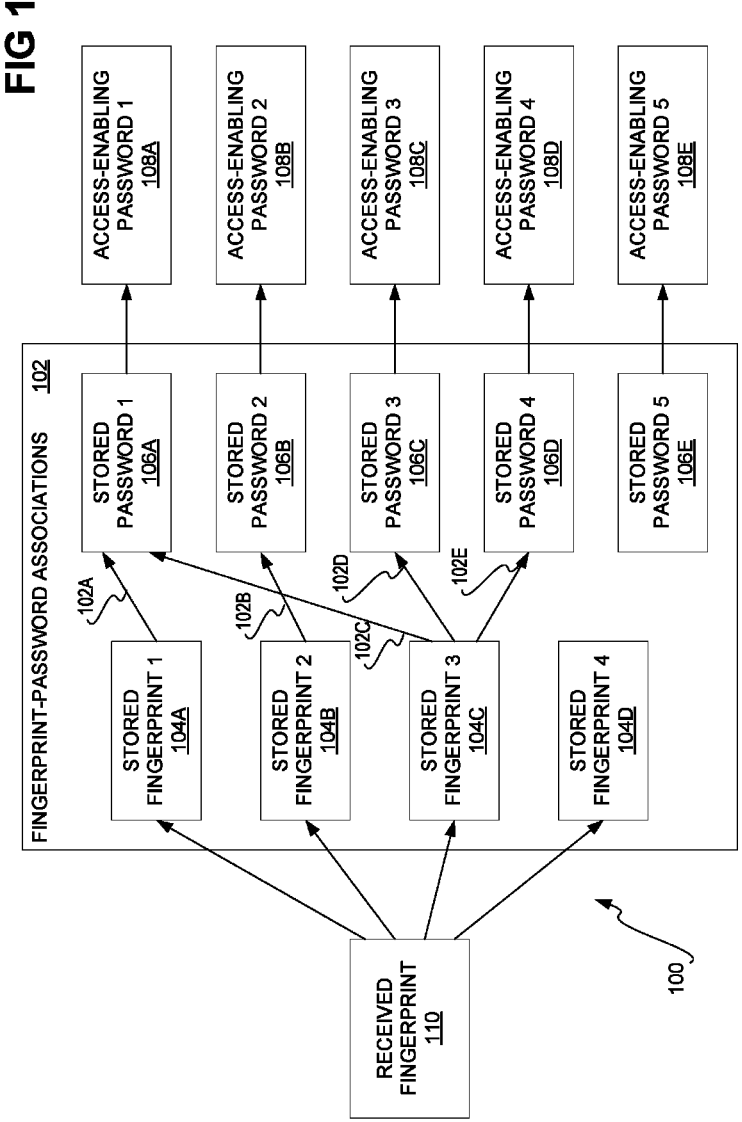
FIG. 1 is a diagram depicting an example association between biometric information and passwords, according to an embodiment of the invention.

FIG. 1 shows an example scenario 100 in which there are associations 102 between biometric information and passwords, according to an embodiment of the invention. The associations 102 are particularly between stored fingerprints 104A, 104B, 104C, and 104D, collectively referred to as the stored fingerprints 104, and stored passwords 106A, 106B, 106C, 106D, and 106E, collectively referred to as the stored passwords 106. There are five associations collectively referred to as the associations 102: the associations 102A, 102B, 102C, 102D, and 102E. The stored fingerprints 104 are one type of biometric information, and are used for representative and example purposes only. In other embodiments of the invention, other types of biometric information may be used, in addition to and/or in lieu of fingerprints, such as retinal scans, face geometries, voice or speech prints or samples, and so on. The stored fingerprints 104 were previously scanned and stored, and the stored passwords 106 were previously manually entered and stored. The associations 102 were previously made between the stored fingerprints 104 and the stored passwords 106.

The stored fingerprint 104A has an association 102A with the stored password 106A. As an example, the stored password 106A may be a basic input/output password (BIOS) power-on password (POP), which controls access to the loading of an operating system on a computer system. The stored fingerprint 104B has an association 102B with the stored password 106B. As an example, the stored password 106B may be a BIOS supervisor password (SVP), which may control access to administrative settings in addition to the loading of the operating system on a computer system.

The stored fingerprint 104C has associations 102C, 102D, and 102E with the stored passwords 106A, 106C, and 106D, respectively. Thus, a stored fingerprint may have more than one password (i.e., multiple passwords) associated therewith. As an example, the stored passwords 106C and 106D, as well as the stored password 106E, may be hard disk passwords (HDP's), which control access to the hard disk drives or other storage devices of a computer system. The stored fingerprint 104D is not associated with any of the passwords 106, and the stored password 106E does not have any of the stored fingerprints 104 associated therewith.

The example scenario 100 includes access-enabling passwords 108A, 108B, 108C, 108D, and 108E, collectively referred to as the access-enabling passwords 108. Each of the access-enabling passwords 108 is the password that must be entered—either manually or via passing or assertion as a result of associated biometric information—for a user to be permitted access to the computer system in some way. For example, the access-enabling password 108A may be a BIOS POP, the access-enabling password 108B may be a BIOS SVP, whereas the access-enabling passwords 108C, 108D, and 108E may be HDP's. The stored passwords 106 correspond to their like-lettered counterparts of the access-enabling passwords 108.

The example scenario 100 thus works as follows. The fingerprint of a user is scanned in, as a received fingerprint 110. The received fingerprint 110 is matched to one of the stored fingerprints 104. If the received fingerprint 110 matches the stored fingerprint 104A, then the associated stored password 106A is passed to or asserted against the access-enabling password 108A. If the passwords 106A and 108A match, then the user is permitted access in accordance with, or as provided by, the access-enabling password 108A. If the passwords 106A and 108A do not match, then the user may be afforded an opportunity to manually enter a password, which is then passed to or asserted against the access-enabling password 108A for matching.

Similarly, if the received fingerprint 110 matches the stored fingerprint 104B, then the associated stored password 106B is passed to or asserted against the access-enabling password 108B. If the passwords 106B and 108B match, then the user is permitted access in accordance with, or as provided by, the access-enabling password 108B. If the passwords 106B and 108B do not match, then the user may be afforded an opportunity to manually enter a password, which is then passed to or asserted against the access-enabling password 108B for matching.

If the received fingerprint 110 matches the stored fingerprint 104C, then the associated stored passwords 106A, 106C, and 106D are passed to or asserted against the access-enabling passwords 108A, 108C, and 108D, respectively. If the passwords 106A and 108A match, then the user is permitted access in accordance with, or as provided by, the password 108A, whereas if the passwords 106C and 108C match, then the user is permitted access in accordance with, or as provided by, the password 108C. Similarly, if the passwords 106D and 108D match, then the user is permitted access in accordance with, or as provided by, the password 108D. If any of the passwords 106A and 108A, the passwords 106C and 108C, and the passwords 106D and 108D do not match, then the user may be afforded an opportunity to manually enter one or more passwords, which are then passed or asserted against the passwords 108A, 108C, and/or 108D as appropriate.

If the received fingerprint 110 matches the stored fingerprint 104D, then none of the stored passwords 106 are passed to or asserted against the access-enabling passwords 108, since the stored fingerprint 104D is not associated with any of the stored passwords 106. Furthermore, the received fingerprint 110 may not be present. For instance, the biometric scanning mechanism employed may not be operative, or may not be present. As another example, the user may have suffered an injury that prevents him or her from pressing his finger against a biometric scanning mechanism. In such cases, the user may be afforded an opportunity to manually enter one or more passwords, which are then passed or asserted against the passwords 108.

In one embodiment, the associations 102 between the stored fingerprints 104 and the stored passwords 106 can be employed to determine the privilege level to be accorded to the user providing the received fingerprint 110. For example, the user having the stored fingerprint 104A may have a given privilege level due to the single association 102A with the stored password 106A, whereas the user having the stored fingerprint 104B may have a different privilege level due to the association 102B with the stored password 106B. Similarly, the user having the stored fingerprint 104C may have a different privilege level due to the associations 102A, 102C, and 102D with the stored passwords 106A, 106C, and 106D, respectively. Finally, the user having the stored fingerprint 104D may not have any privilege level, since the fingerprint 104D has no association with any of the stored passwords 106. A privilege level may indicate, for instance, whether the user is an administrator, end user, or guest on a given computer system, having privileges associated with being an administrator, end user, or guest.

The example scenario 100 preferably provides for continuous authentication. That is, as soon as the user's fingerprint is pressed against a biometric scanning mechanism and the received fingerprint 110 is provided, the associations 102 are examined and the stored passwords 106 are asserted against or passed to the access-enabling passwords 108 as appropriate. A user or the computer system in question, in other words, does not have to load any special application program in order to provide for authentication.

Figure 2:
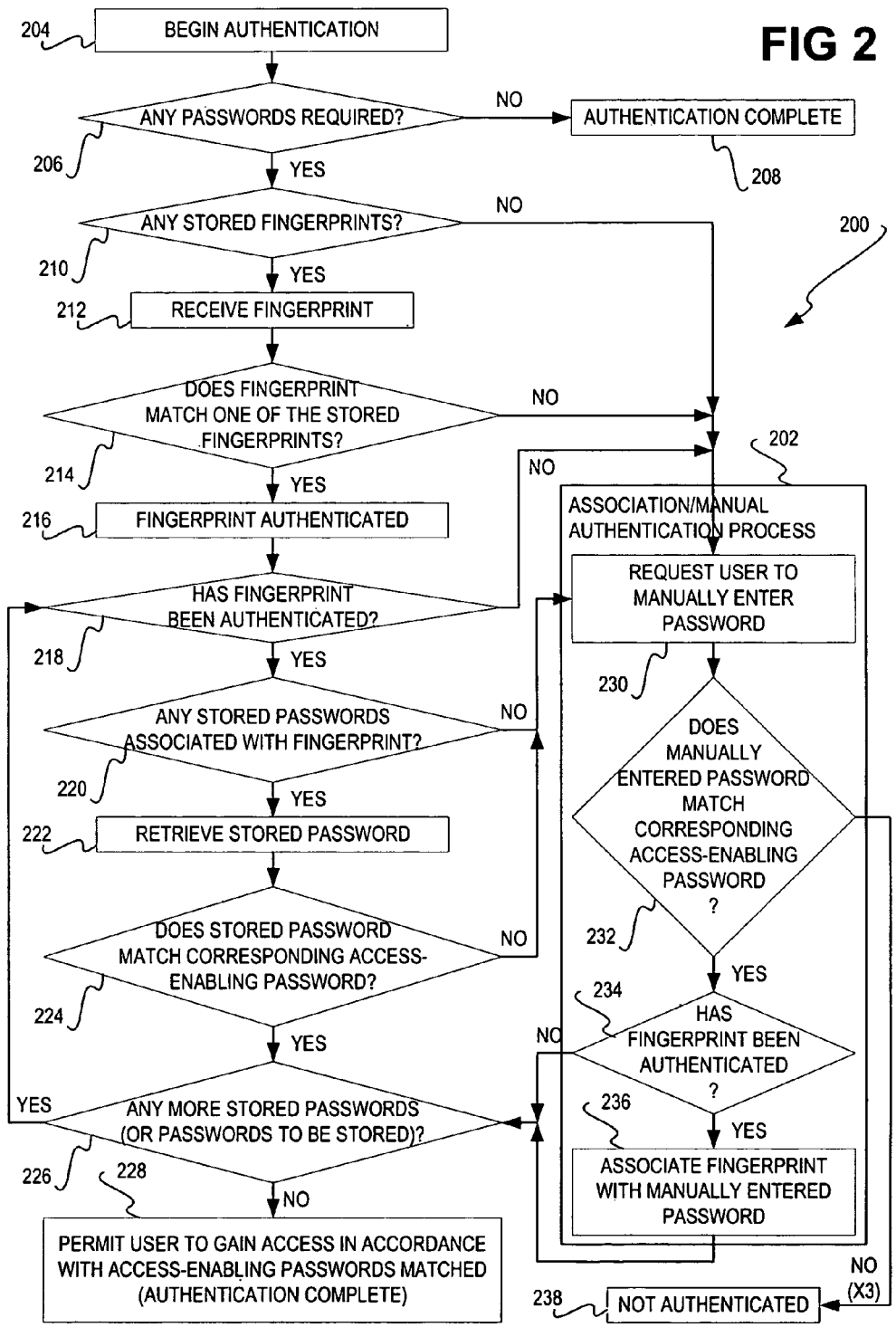
FIG. 2 is a flowchart of a method for associating biometric information with passwords, and by using such association in the context of security for a computer system, according to an embodiment of the invention.

FIG. 2 shows a method 200 for authentication using biometric information or passwords, according to an embodiment of the invention. The method 200 includes a biometric information-to-password association and manual authentication process 202. The method 200 may be implemented at least in part as one or more computer programs stored on a computer-readable medium, such as a recordable data storage medium or a modulated carrier signal. The method 200 may be implemented further in conjunction with the BIOS of a computer system, or another legacy security framework. The method 200 is particularly described in relation to fingerprints, but is applicable to other types of biometric information as well.

The authentication process begins (204). If passwords are not required for authentication (206), then the authentication process successfully completes (208). Furthermore, if there are no stored fingerprints (210), then the manual authentication process 202 is started. However, if there are stored fingerprints (210), then the user's fingerprint is received (212). For instance, the user may press his or her finger against a scanning pad of a biometric mechanism, which scans the fingerprint. If the received fingerprint does not match any of the stored fingerprints (214), then the manual authentication process 202 is started.

If the received fingerprint does match any of the stored fingerprints (214), then it is considered that the fingerprint has been authenticated (216). Thus, because the fingerprint has been authenticated (218), the method 200 determines whether there are any stored passwords associated with the fingerprint (220). If not, then the association process 202 is performed. Otherwise, one of the stored passwords is retrieved (222), such as from non-volatile memory or another type of non-volatile storage device. If the stored password does not match its corresponding access-enabling password (224), however, then the association/manual authentication process 202 is begun.

Where the stored password does match—i.e., is identical to—its corresponding access-enabling password (224), the method 200 determines next whether there are any more stored passwords (226). If so, then the method 200 repeats 218, 220, and 222 et seq., with the next stored password. Once all of the stored passwords have been so processed, then the method 200 finishes by permitting the user to gain access in accordance with the access-enabling passwords that have been successfully matched (228), such that the authentication process is complete.

The biometric information-to-password and manual authentication process 202 is as follows. The user is requested to manually enter a password (230), such as by typing the password using a keyboard. If the manually entered password does not match a corresponding access-enabling password (232), then the user is given up to a limited number of tries to enter the correct password—i.e., one that is identical to the corresponding access-enabling password—such as a total of three tries. If the user does not enter the correct password in any of these three tries, then authentication fails as to that access-enabling password (238).

Where the user does manually enter a password that matches its corresponding access-enabling password (232), then the process 202 determines whether the fingerprint has been authenticated (234), such as in 216. This determination is made to determine whether the process 202 as is currently being performed is a biometric information-to-password association process, where the process 202 is currently being performed directly from 220 or 224, or is a manual authentication process, where the process 202 is currently being performed directly from 210, 214, or 218. That is, the process 202 is a biometric information-to-password association process where its performance begins directly from 220 or 224, and is a manual authentication process where its performance begins directly from 210, 214, or 218.

Thus, if the fingerprint has not been authenticated (234), then the process 202 is a manual authentication process, and the method 200 continues to 226. In 226, the method 200 determines whether there are any more passwords to be stored, and continues on to 218 or 228 as appropriate. If the fingerprint has been authenticated (234), however, then the process 202 is a manual authentication process, and the method 200 associates the fingerprint that has been authenticated with the manually entered password (236). That is, the manually entered password is stored as one of the stored passwords associated with the stored fingerprint, such that subsequent performance of the method 200 will not require the association process 202 to be performed again as to this password (i.e., the user should not have to manually enter this password in again). After 236, the method 200 continues to 226 as before.

Figure 3:
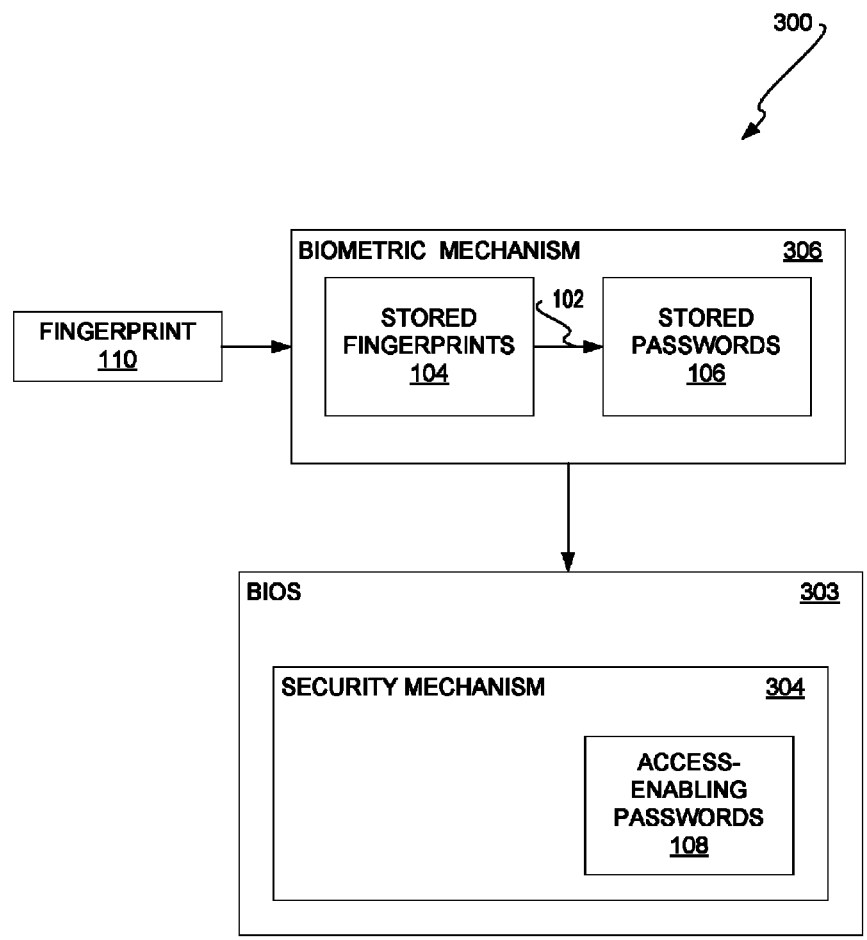
FIG. 3 is a diagram of a computer system in which biometric information is associated with passwords, according to an embodiment of the invention.

FIG. 3 shows a computer system 300, according to an embodiment of the invention. The computer system 300 is described in relation to biometric information that includes fingerprints, but may be used in conjunction with other types of biometric information as well. The computer system 300 includes a biometric mechanism 306, and a BIOS 303. The BIOS 303 includes a security mechanism 304. The security mechanism 304 is one type of a legacy password framework in which access-enabling passwords 108 are employed to authenticate users in order to allow them to gain access in accordance with the passwords 108. In other embodiments of the invention, other types of security mechanism, besides those that are legacy password frameworks and/or besides those that are part of a BIOS, may be employed.

The biometric mechanism 306 receives a fingerprint of a user, such as the received fingerprint 110. The biometric mechanism 306 may be an internal or external fingerprint-scanning device. The biometric mechanism 306 stores the stored fingerprints 104 that have the associations 102 with the stored passwords 106, as has been discussed in relation to FIG. 1, such as in non-volatile memory or other non-volatile storage. The biometric mechanism 306 attempts to match the fingerprint 110 against one of the stored fingerprints 104. Upon so matching, those of the stored passwords 106 that are associated with the matched one of the stored fingerprints 104 are passed to the security mechanism 304 for matching against the access-enabling passwords 108, or the security mechanism 304 otherwise asserts the stored passwords 106 in question against the access-enabling passwords 108. It is noted that because the biometric mechanism 306 stores the stored fingerprints 104 and the stored passwords 106, no special application computer program needs to be loaded into the system 300 for the authentication to be performed Furthermore, it is noted that the security mechanism 304 initially prompts the user for entry of the passwords 106 and, where the passwords 106 match the passwords 108, the biometric mechanism 306 associates the passwords 106 with the stored fingerprints 104 where the passwords 106 have not yet been stored in the biometric mechanism 306.

The security mechanism 304 may be implemented in hardware, software, or a combination of hardware and software. The security mechanism 304 stores the access-enabling passwords 108 that have been discussed in relation to FIG. 1, such as in non-volatile memory or other non-volatile storage. Where there is a match between the appropriate stored passwords 106 and the access-enabling passwords 108, the security mechanism 304 permits the user to gain access in accordance with the access-enabling passwords 108. That is, those of the access-enabling passwords 108 that have been matched have corresponding access and/or privilege levels that the user is then accorded.

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. It is manifestly intended that this invention be limited only by the claims and equivalents thereof.

We claim:

1. A method comprising:
 receiving biometric information from a user;
 in response to determining that the biometric information matches stored biometric information and in response to determining that one or more stored passwords are not present, performing:
  requesting the user to manually enter one or more passwords so that the user is subsequently not required to manually enter the one or more passwords where the biometric information received from the user matches the stored biometric information when the method is performed again;
  in response to determining that the one or more passwords are identical to the one or more access-enabling passwords, performing:
   storing the one or more passwords as the one or more stored passwords associated with the biometric information;
   permitting the user to gain the access associated with the one or more access-enabling passwords.

2. The method of claim 1, further comprising, in response to determining that the biometric information matches the stored biometric information, but that the one or more stored passwords are not identical to the one or more access-enabling passwords,
 requesting the user to manually enter one or more passwords;
 storing the one or more passwords as the one or more stored passwords associated with the biometric information;
 in response to determining that the one or more passwords are identical to the one or more access-enabling passwords,
  permitting the user to gain the access associated with the one or more access-enabling passwords.

3. The method of claim 1, wherein the one or more stored passwords comprise a basic input/output system (BIOS) power-on password (POP), and permitting the user to gain the access comprises starting an operating system.

4. The method of claim 1, wherein the one or more stored passwords comprise a hard disk password (HDP), and permitting the user to gain the access comprises enabling access to a hard disk drive associated with the HDP.

5. The method of claim 1, wherein the one or more stored passwords comprise a basic input/output system (BIOS) supervisor password (SVP), and permitting the user to gain the access comprises starting an operating system and according the user supervisory privileges.

6. The method of claim 1, wherein the one or more stored passwords correspond to a privilege level of the user, such that where the one or more stored passwords are identical to the one or more access-enabling passwords, the user is accorded privileges in correspondence with the privilege level thereof.

7. The method of claim 1, wherein the biometric information comprises fingerprint information.

8. A system comprising:
 hardware, including a processor;
 a storage device storing computer code executable by the processor to implement:
  a first component to retrieve one or more stored passwords associated with biometric information and to permit a user to gain access to a computer system associated with one or more access-enabling passwords without having to load any computer program into the computer system in a case in which the biometric information matches stored biometric information, the one or more stored passwords are present, and the one or more stored passwords are identical to one or more access-enabling passwords;

a second component to request the user to manually enter one or more passwords so that the user is subsequently not required to manually enter the one or more passwords where the biometric information subsequently received from the user matches the stored biometric information, to store the one or more passwords as the one or more stored passwords associated with the biometric information, and permit the user to gain the access associated with the one or more access-enabling passwords, in a case in which the biometric information matches the stored biometric information, and the one or more stored passwords are not present;

a third component to request the user to manually enter the one or more passwords and permit the user to gain the access associated with the one or more access-enabling passwords where the one or more passwords are identical to the one or more access-enabling passwords in a case in which the biometric information has not been received, in a case in which the biometric information is not present, or in a case in which the biometric information does not match the stored biometric information.

* * * * *